March 11, 1969     K. VOGT     3,432,016
MAGNETIC ROLLER CLUTCH
Filed Aug. 30, 1966
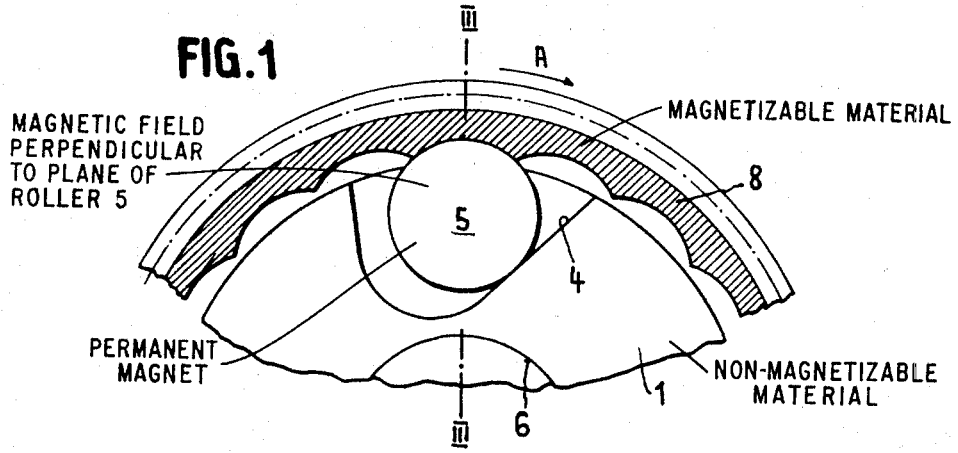
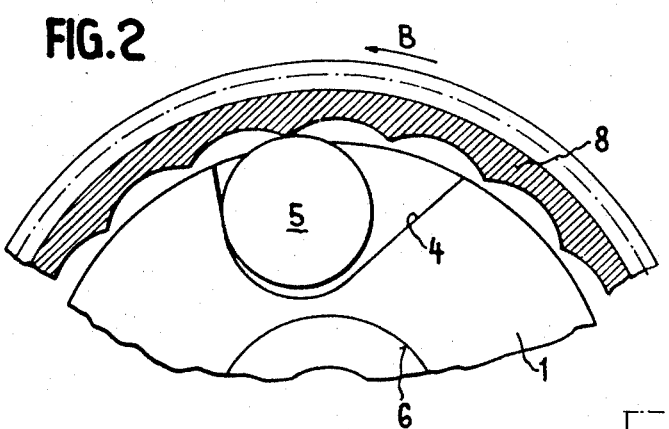
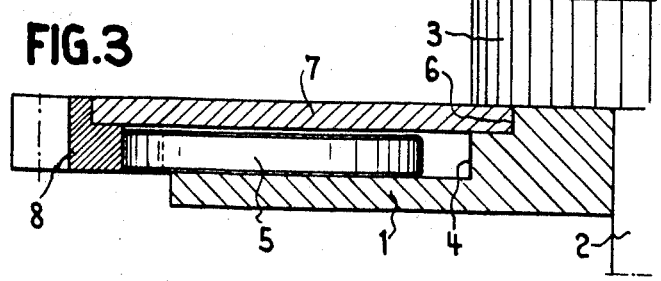
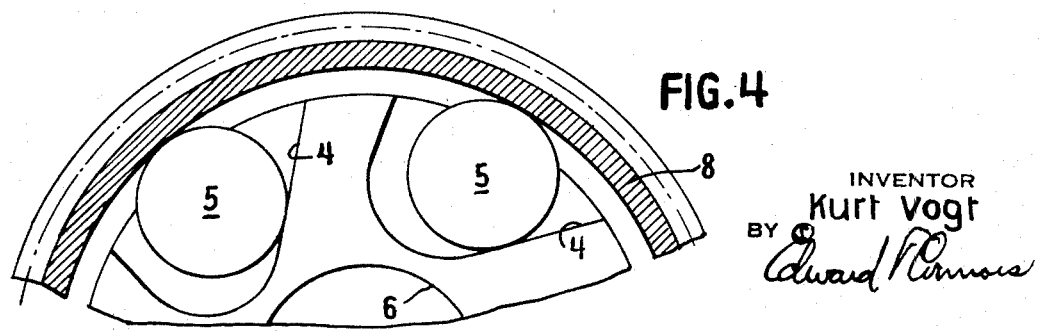
INVENTOR
Kurt Vogt United States Patent Office 3,432,016
Patented Mar. 11, 1969

3,432,016
MAGNETIC ROLLER CLUTCH
Kurt Vogt, Bienne, Switzerland, assignor to Omega Louis
Brandt & Frere S.A., Bienne, Switzerland
Filed Aug. 30, 1966, Ser. No. 576,013
Claims priority, application Switzerland, Sept. 8, 1965,
12,534/65
U.S. Cl. 192—45
Int. Cl. F16d 41/06, 41/07
7 Claims

ABSTRACT OF THE DISCLOSURE

A free wheel coupling device is shown in which a driven element is coupled with a driving element by a roller. The roller is positioned in a notch of one of the elements so that the roller is held against the inner rim of the other element. The roller and the rim form a magnetic circuit at least a portion of which is made of magnetic material. The inner surface of the rim may be smooth or festooned. Either of the elements may be the driving element.

---

The present invention relates to a free wheel coupling device for timepieces, including two coaxial elements, one of which is driving and the other is driven, one of said elements carrying at least one roller arranged in a notch and adapted to cooperate with a wall of the other element, so that the driven element is driven by the driving element only for one sense of rotation of the latter, said roller then jamming between both elements and interlocking said elements with each other. This device is characterized in that the roller is a permanent magnet and the part of the other element cooperating with the roller is made of a magnetizable material, the element which carries the roller being made of a non-magnetizable material.

The accompanying drawing illustrates, by way of example, an embodiment of the invention.

FIG. 1 is a top plan view, partly in section, of said embodiment showing the elements in driving position.

FIG. 2 is a similar view, showing the elements in non-driving position.

FIG. 3 is a cross-sectional view, at an enlarged scale, taken along the line III—III of FIG. 1.

FIGURE 4 is a view corresponding to FIGURES 1 and 2 but illustrating the inner surface of the rim as a cylindrical surface and illustrating a plurality of rollers.

The device illustrated in the drawing has two coaxial rotary parts. The first rotary part, forming the driven element, includes a disk 1 keyed onto a shaft 2 rigidly connected to a pinion 3. The disk 1 has on its upper face a notch or cut out portion 4 open towards the outside and in which is disposed a roller 5, i.e. a cylindrical body of small height. The notch 4 has the shape shown in FIGS. 1 and 2 and has a rounded bottom and two lateral flanks one of which extends almost radially, whereas the other extends chordally.

On a bearing surface 6 of the disk 1 is rotatably mounted a toothed wheel made of two parts, i.e. a disk 7 and a rim or flange 8, the latter part being thicker than the disk 7 and partially facing the roller 5.

The roller 5 consists of a permanent magnet the magnetic field of which is preferably perpendicular to the plane of the roller. The rim 8 of the wheel 7, 8 is made of soft iron or another magnetizable material. As shown in FIGS. 1 and 2, the inner edge of the rim 8, as seen in a plan view, is festooned or scalloped, i.e. it is formed by a series of arcs of a circle the radius of which is equal to that of the roller 5, each arc of circle extending over about 80° and the centers of these arcs being placed within the rim 8. The disks 1 and 7 are made of a non-ferrous metal, for instance of brass. The roller 5 is freely maintained in the notch 4 of the disk 1 and is axially retained by the disk 7.

The operation is as follows:

Let us suppose that the wheel 7, 8, is rotated in the direction of the arrow A (FIG. 1). The roller 5, attracted by the rim 8, takes the position illustrated in FIG. 1, i.e. a portion of its periphery is applied against one of the festoons of the rim 8. Due to this fact, the roller 5 has been displaced in the notch 4 and now bears against the right-hand flank of said notch. When the rim 8 tends to rotate to the right, in the direction of the arrow A or clockwise direction in FIG. 1, a butting occurs, the roller 5 jamming between the rim 8 and the notch 4 of the disk 1. Therefore, the rim 8 is interlocked with the disk 1, so that the pinion 3 is driven in the same direction as the wheel 7, 8.

Let us now assume that the wheel 7, 8 is rotated in the reverse direction, namely in the direction of the arrow B (FIG. 2), from the jamming position above described. The roller 5 is then driven in the same direction as the rim 8 and rolls over the bottom of the notch 4, so that the disk 1 is not driven. In this disconnected position, the roller 5 arrives opposite a point situated between two festoons of the rim 8, as shown in FIG. 2. When the rim 8 is further rotated in the direction of the arrow B, the roller 5 oscillates between two end positions, since it is at one time magnetically attracted by the rim 8 and at another time mechanically pushed back by the festoons of the latter.

If the wheel 7, 8 is again rotated in the direction of the arrow A, the roller 5 immediately jams as first described, so that the backlash of the clutch is very small.

In a modified embodiment, the festoons of the rim 8 might be omitted, the rim then having a mere cylindrical wall 8a, which would also guarantee a sure jamming of the roller 5.

Instead of a single roller, two or more rollers might be provided, resulting in a balanced system with reduced backlash.

It would also be possible to make the roller 5 of a magnetizable material, for instance of soft iron, and to have a rim 8 made of a permanent magnet. The operation would be the same as described above. In both cases, it is to be understood that the magnetic field is rather weak; it has to be just sufficient for overcoming the weight of the roller or rollers.

Instead of rotating the wheel 7, 8, it is of course also possible to rotate the shaft 2 together with its pinion 3 and its disk 1. In this case, the device is in its connected or coupled state when the disk 1 is rotated in the counterclockwise direction in FIG. 1, and in its unconnected or uncoupled state when the disk 1 is rotated in the reverse direction.

The provision of a magnetic attraction between the roller 5 and the rim 8 guarantees a perfect operation of the device. It has been established indeed that the known devices of the same kind, but without permanent magnet, have the drawback that the roller tends to stick in the bottom of its notch, even when the driving element is rotated in the direction for which the roller should operate for interlocking the driven element with the driving element. This drawback is entirely done away with the device according to the invention.

The device as shown and described is applicable for instance in the self-winding watches in which the main spring has to be wound up, whatever the direction of rotation of the winding weight may be, or in which the manual winding mechanism has to be rendered independent of the self-winding mechanism. In these cases two coupling devices according to the invention may be used and are to be arranged either coaxially to each other or on different shafts.

While a representative embodiment and details have been shown for the purpose of illustrating the invention, it will be apparent to those skilled in the art that various changes and modifications may be made therein without departing from the spirit or scope of the invention.

What is claimed is:

1. A free wheel coupling device for timepieces comprising two coaxial elements, either one of said elements being adapted to be driven by the other of said elements, a roller, one of said elements having a notch carrying said roller and cooperating with a rim of said other element so that one element is driven by the other element only for one direction of rotation of the driving element, said roller then jamming between both said elements for the simultaneous movement thereof, characterized in that said roller is permanently magnetized and said rim of said other element is made of material forming a magnetic circuit with said roller, and said notch bearing element is a non-magnetizable material, whereby said roller is continuously held against said rim by magnetic flux passing mainly through said rim and said roller.

2. A free wheel coupling device according to claim 1 in which said roller is disc shaped, its thickness being less than its diameter, the magnetic field being perpendicular to the plane of its flat surface.

3. A free wheel coupling device according to claim 1 in which said notched element is the driving element.

4. A free wheel coupling device according to claim 1 in which said rimmed element is the driving element.

5. A free wheel coupling device according to claim 1 in which the inner surface of said rim is festooned.

6. A free wheel coupling device according to claim 1 in which the inner surface of said rim is a cylindrical surface.

7. A free wheel coupling device according to claim 1 in which a plurality of rollers are included.

References Cited

UNITED STATES PATENTS

| | | | |
|---|---|---|---|
| 2,300,223 | 10/1942 | Hottenroth | 192—45 |
| 2,410,818 | 11/1946 | Grant | 192—45 |
| 2,624,435 | 1/1953 | Stephenson | 192—45 |
| 2,804,184 | 8/1957 | Bjork | 192—45 |
| 1,719,881 | 7/1929 | Farmer | 192—45 |
| 2,554,221 | 5/1951 | Stephenson et al. | 192—45 |
| 2,583,843 | 1/1952 | Herrick | 192—45 |
| 2,800,987 | 7/1957 | Potts | 192—45 |

CARLTON R. CROYLE, *Primary Examiner.*

A. D. HERRMANN, *Assistant Examiner.*

U.S. Cl. X.R.

192—84